W. E. HILL.
LAWN TRIMMING ATTACHMENT.
APPLICATION FILED JAN. 12, 1911.
1,010,260.
Patented Nov. 28, 1911.
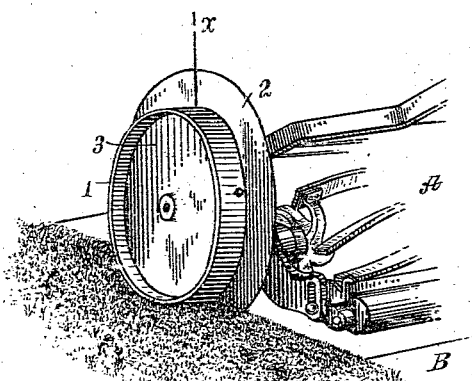
Fig. 1.
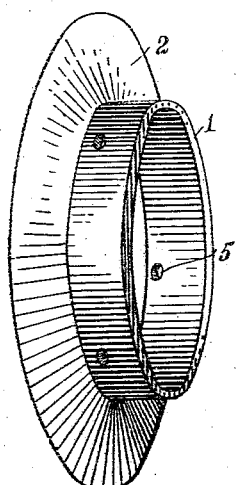
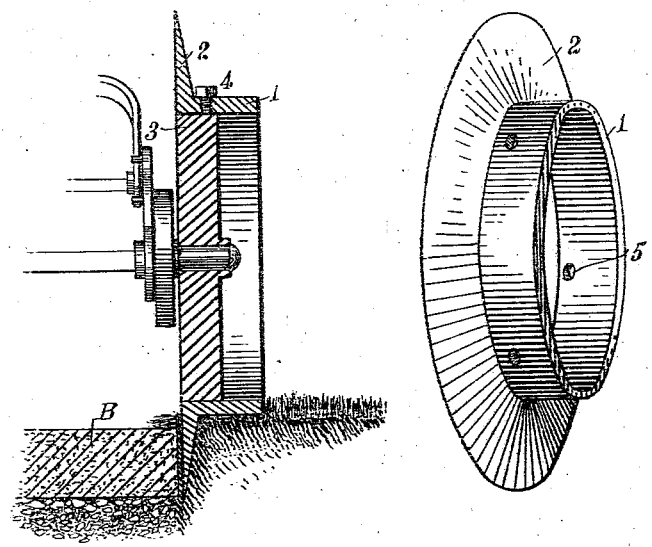
Fig. 2.
Fig. 3.
WITNESSES:
Genge Bamlay
P.S.Rollhaus
INVENTOR
William E. Hill
BY Munn & Co
ATTORNEYS

UNITED STATES PATENT OFFICE.

WILLIAM E. HILL, OF CHARLESTON, ILLINOIS.

LAWN-TRIMMING ATTACHMENT.

1,010,260.  Specification of Letters Patent.  Patented Nov. 28, 1911.

Application filed January 12, 1911. Serial No. 602,232.

*To all whom it may concern:*

Be it known that I, WILLIAM E. HILL, a citizen of the United States, and a resident of Charleston, in the county of Coles and State of Illinois, have invented a new and useful Improvement in Lawn-Trimming Attachments, of which the following is a full, clear, and exact description.

In the use of lawn mowers of the usual form of construction, it has proved in practical operation to be substantially impossible to cut the grass on the extreme edge of a plot, especially where such edge forms the border of a road, walk or the like; furthermore the pressing roller of a lawn mower when used at the edge of a plot flattens the grass which is not cut, causing it to project outward over the edge, and also presses or breaks down the turf or sod in such a manner as to destroy the symmetry and straight alinement of the face of the border. Necessity has therefore arisen for the use of other implements for trimming or edging lawns or grass plots, such other implements either requiring great care and precision in their use with the resulting expenditure of considerable time and labor, or being in form complicated and hence more or less costly devices.

It is the purpose of my invention to provide a lawn trimming or edging attachment of novel form and design, which may be detachably secured to a wheel of an ordinary lawn mower and when in position may be efficiently operated, with a minimum of time and labor required, to cut off all grass projecting outward over the edge or border of a grass plot, and to trim the face of the turf or sod in a uniform and symmetrical manner.

My device may be adjusted for use and operated by an unskilled laborer, and is of simple design and construction, capable of being manufactured at a low cost.

Reference is to be had to the accompanying drawings forming a part of this specification, in which similar characters of reference indicate corresponding parts in all the views.

Figure 1 represents a view in perspective of one end of a lawn mower having an attachment embodying my invention secured to the wheel thereof; Fig. 2 represents a view in vertical section taken on the line *x* of Fig. 1; Fig. 3 represents a view in perspective of the attachment alone.

In the form of my invention shown, the trimming or edging attachment consists of a circular rim or ring 1 provided at one edge with a radially projecting flange 2 thereon and preferably integral therewith. The flange 2 is of desired depth and tapers to a cutting edge at its periphery. The attachment is secured in position on a wheel 3 of a lawn mower A in the instance shown, by means of set screws 4 passing through holes 5 in the rim 1 and bearing tightly upon the lawn mower wheel 3. In practice, the cutting or edging attachments will be manufactured in various sizes to fit lawn mower wheels of differing diameters, but as the size of lawn mower wheels is substantially uniform, only a limited range of sizes of the attachment will be required. The rim 1 is preferably made comparatively broad, in order that the turf or sod at the edge of the grass plot may be held firmly in place during the cutting or edging operation.

From the foregoing description the operation of my trimming or edging attachment will be apparent. The attachment may be readily secured in place when its use is desired, and the mower being run along the edge of a grass plot, as for example at the edge of a walk B, the rim of the attachment presses firmly on the turf adjacent the edge, the cutter flange extending downward at the edge of the plot, cutting off all outwardly projecting grass, and trimming the face of the border uniformly in a straight and continuous line.

It is characteristic of my invention that the cutter is in the form of a member projecting from the body of the wheel, so that it is the body of the wheel, and not the axle or frame parts, that is the sole supporting means for the trimming cutter. It is advantageous to locate the trimming cutter outside the frame of the mower, yet at the inside of the wheel, and this I have provided for.

I prefer to employ the ring and screws, or their equivalent, as a very simple and efficient means of mounting the annular trimming cutter on a running wheel of an ordinary lawn mower. The trimming cutter is connected with the running wheel, and yet is attachable and detachable without disturbing the axle wheel or its appurtenances.

While I have herein shown and described a particular desired embodiment of my invention, it will be apparent to those skilled in the art that changes and modifications may be made in the form, design and location of parts without departing from the spirit of my invention as set forth in and falling within the scope of the claims hereto appended.

Having thus described my invention, I claim as new and desire to secure by Letters Patent:

1. The combination with a ground wheel of a lawn mower, of a ring-like body provided at one edge with a cutting flange having one side vertical, and its other side inclined, said body being of greater width than the tread of the wheel and detachably mounted thereon with its flange at the inner side of said wheel and in vertical alinement therewith whereby a portion of the band will project beyond the tread of said wheel to form means for compressing the turf to facilitate the cutting thereof.

2. A lawn trimming attachment for lawn mowers adapted to be secured upon a ground wheel of the mower, comprising a ring-like body of greater width than the tread of the wheel upon which it is to be used, and provided at one edge with a cutting flange having one side vertical and in alinement with the inner edge of the body and its other side inclined.

In testimony whereof, I have signed my name to this specification in the presence of two subscribing witnesses.

WILLIAM E. HILL.

Witnesses:
JOHN ROMIZER,
MINOR BEST.